Figure 1:
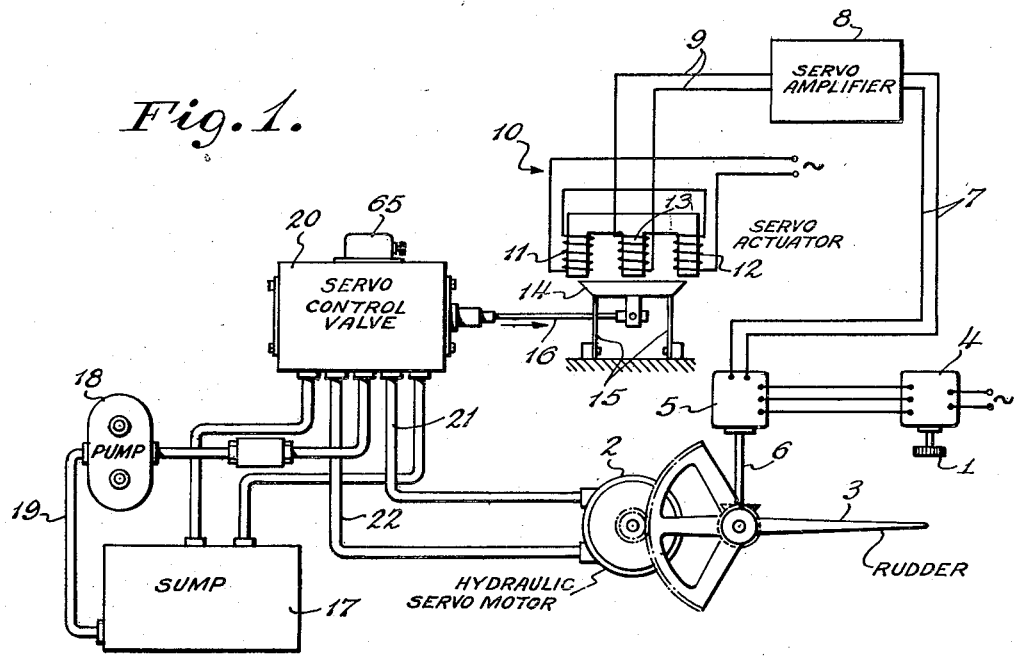

Sept. 28, 1954  H. C. DANNHARDT  2,690,192

PILOT-OPERATED CONTROL VALVE FOR HYDRAULIC SERVO SYSTEMS

Filed May 11, 1949

INVENTOR
HARRY C. DANNHARDT
BY
HIS ATTORNEY

Patented Sept. 28, 1954

2,690,192

UNITED STATES PATENT OFFICE 2,690,192

PILOT-OPERATED CONTROL VALVE FOR HYDRAULIC SERVO SYSTEMS

Harry C. Dannhardt, Levittown, N. Y., assignor to The Sperry Corporation, a corporation of Delaware Application May 11, 1949, Serial No. 92,651

7 Claims. (Cl. 137—620)

My invention relates generally to hydraulic positional control systems and has reference more particularly to a novel fluid control valve for controlling the servomotor of such a system.

Hydraulic servo systems generally include a fluid sump or a reservoir, a pump for circulating the fluid throughout the various elements of the system, and a hydraulic motor which is actuated by the circulating fluid and may be arranged to be of the reversible type wherein its direction of operation is dependent upon the direction of the flow of fluid therethrough. Such a system further includes a control valve which may be operated by any type of signal responsive means under the control of an operator or automatic signal producing means. The control valve controls the rate of flow of fluid and the direction of such flow through the positioning of a member which is operated by said signal responsive means. Such systems are particularly adaptable to the positioning of heavy bulky devices, such as, for example, a gun turret or the rudder of a craft. Such positionable devices require an operating force of considerable magnitude through the application of a control force of extremely low magnitude.

My invention resides in a novel form of control valve of this character. Such valves generally comprise a body portion having suitable passages and ports connected with the source of fluid pressure, the hydraulic motor, and a sump for receiving exhaust fluid. The body portion has slidably mounted therein a piston-type valve element which has surface areas or lands which cooperate with the ported passages of the body to control the flow of fluid in either direction therethrough, depending on its position relative to the valve body, to the servomotor. In many control valves, the movement of piston type valve element is controlled by a pilot valve or booster valve.

A positional control system of the above character often employs transmission of appreciable power by the use of very high fluid pressures flowing at high velocities. In such high pressure, high velocity fluid systems the valve element of the control valve may be subjected to forces which may react on the servo actuator device thereby requiring stronger valve actuating force. These reactive forces are generally caused by the Bernoulli effect at the peripheries of the lands and ports of the valve. The control valve of my invention however essentially eliminates any such reactionary force on the valve actuator device by providing a pilot valve for actuating the main control valve. The fluid pressure to which the pilot valve is subjected may be selected for optimum operation conditions and may be completely independent of the fluid pressure controlled by the main valve. Under these conditions the pilot valve may be actuated by an extremely small force while the servomotor control valve may require many, many times this force.

A feature of my invention resides in the provision of a fluid control valve for a hydraulic servo system in which reactive forces on the control valve actuator device are greatly reduced. Another feature resides in the provision of a fluid control valve wherein the valve element is moved or actuated by a pilot or booster valve operating under a fluid pressure independent of the fluid pressure in the main control valve.

It is another feature of my invention to provide an improved control valve which may control the flow of fluid at very high pressures and high velocities and yet be operated by forces of extremely small magnitude. Still another feature of my invention resides in the provision of a control valve for a fluid system wherein there are no orifices which may become clogged with foreign matter in the fluid. Another feature of the invention is to provide a fluid control valve wherein the flow of fluid therethrough is controlled by the control of fluid pressure on one side only of the main valve element by the pilot valve. A further feature of my invention resides in the provision of a fluid control valve of simple construction and easily manufactured. That is, one in which all critical surfaces thereof are cylindrical and therefore may be ground and/or lapped to the precise fit required, and wherein the bore of the main valve body need not necessarily be concentric with the bore of the pilot valve, and wherein the stem of the valve member of the pilot valve is of rigid construction and therefore is unlikely to bend or become misaligned within its bore.

Figure 2:
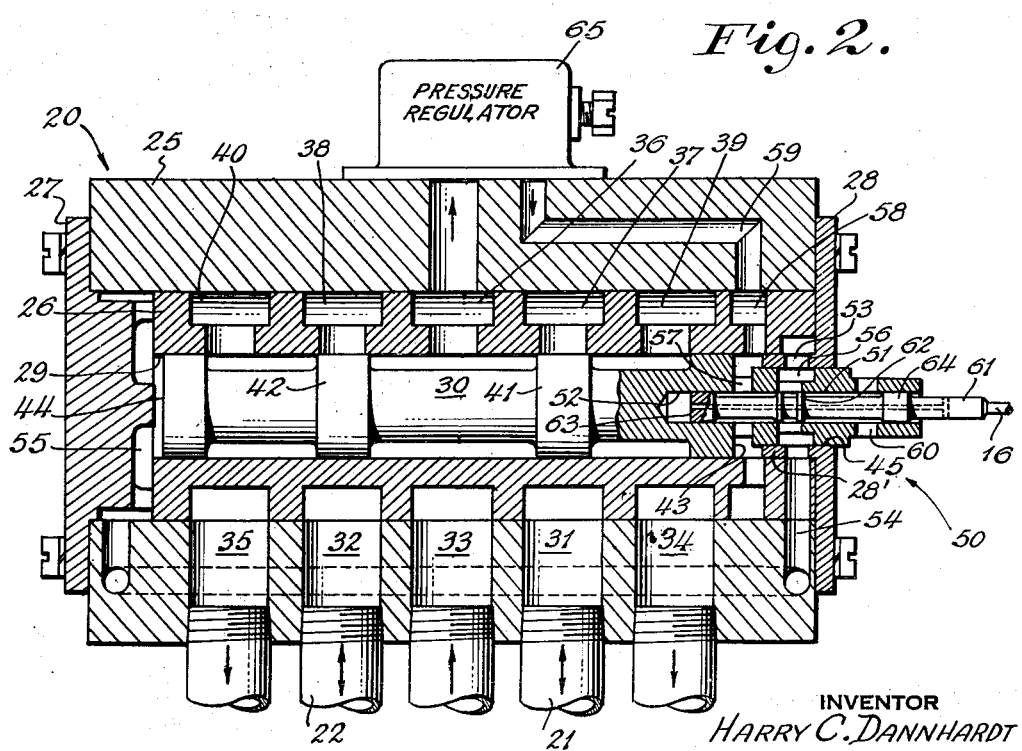

With the foregoing and other features in view, my invention includes a novel control valve for an hydraulic system and the novel control elements therein contained which are described below and illustrated in the accompanying drawings, in which:

Fig. 1 is a schematic representation of a system in which the valve of my invention is particularly adaptable, and Fig. 2 is a longitudinal view of the control valve of the system illustrated in Fig. 1.

In order to further a complete understanding of my invention I have shown in Fig. 1 a complete positional control system in which the control valve of my invention is used to control the operation of an hydraulic motor through the application of a very small control force.

As herein illustrated, I have shown a reference member indicated generally at 1 which may be positioned or moved either manually or automatically to provide a positional reference employed for controlling the operation of a servomotor 2 and the positioning thereby of some positional object or element. For example, the reference member may be associated with the compass of an automatic ship's steering system and the positionable object may comprise the rudder 3 of the ship.

In the embodiment shown, reference member 1 is directly coupled to the rotor shaft of a transmitter or signal generator 4 which may be a Selsyn or Autosyn transmitter. The stator of the transmitter 4 is electrically connected with the stator of a similar device or receiver 5, the rotor of which may be positioned by a feed-back connection 6 from the rudder 3, to be hereinafter more fully described. The rotor of the transmitter 4 is connected to a suitable source of alternating voltage and the rotor of receiver 5 is connected through leads 7 to the input of a servo amplifier 8. Therefore, movement of the reference member 1 will produce in the rotor winding of receiver 5 an error signal which is proportional to the angular position of the rotor of transmitter 4 relative to the rotor of receiver 5. This error signal appearing on leads 7 is connected to the servo amplifier 8. The output of amplifier 8 appears on leads 9 and is connected to energize a servo actuator, generally indicated at 10. Such an actuator may be of the type more fully disclosed and described in copending application S. N. 18,543 entitled Linear Motion Magnetic Motor, filed April 2, 1948, now Patent No. 2,655,132 of October 13, 1953, in the name of Richard Scheib, Jr. For the purpose of the present description however, it will be sufficient to describe the servo actuator as an E-type of linear motor which comprises a pair of outer legs 11 and 12 excited by a suitable source of alternating voltage and a central leg 13 which is excited by the output of servo amplifier 8 through leads 9. The movement of the armature 14 of the actuator motor 10 is controlled in direction and magnitude by the direction and magnitude of the voltage output of servo amplifier 8 applied to the central leg 13 of the actuator 10. As more fully described in the above-mentioned copending application, the armature 14 is restrained and moves linearly in one direction or the other by suitable parallel spring connection 15. Securely attached to the armature 14 is a control valve actuating rod 16, whose position therefore is governed by movement of the armature 14 of the servo actuator motor 10, the movement thereof controlling the direction and rate of flow of fluid through the hydraulic portion of the positional control system to be more fully described below.

The hydraulic portion of the positional control system comprises generally a sump or reservoir 17 containing a supply of motive fluid such as highly refined servo oil. A pump 18 which may be driven by a prime mover (not shown) is connected to the sump through conduit 19 and arranged to provide fluid pressure therefrom for driving the hydraulic servomotor 2. As is explained above, hydraulic servomotor 2 is of the reversible type. That is, its direction of movement is controlled by the direction of the flow of fluid therethrough. Such hydraulic motors are well known in the art and may be of the Vickers type or any suitable hydraulic ram-type motor. For controlling the operation of the servomotor 2, I have provided a fluid control valve 20 having a linearly movable valve control element or rod 16. The control valve 20 is disposed intermediate the pump 18 and hydraulic motor 2 and may be so arranged as to prevent the flow of fluid through motor 2 when the control rod 16 is neutrally positioned but to permit the flow of fluid from pump 18 therethrough into a first conduit 21 leading to the motor 2 and also to permit the flow of exhaust fluid from motor 2 through conduit 22 and valve 20 into sump 17 when the control element 16 is displaced from any neutral position in the direction indicated by the arrow. The valve 20 may also be so constructed that upon displacement of the control member 16 in the opposite direction from its neutral position, high pressure oil from pump 18 may be routed through conduit 22 into motor 2 and thence exhaust of fluid may be allowed to pass from the motor through conduit 21, and through valve 20 into sump 17, the direction of operation of the motor 2 being thereby reversed in accordance with the reverse direction of displacement of control element 16 from its neutral position.

Movement of the rudder 3 by the operation of motor 2 produces rotation of feed-back shaft 6 connected to the rotor of the receiver 5 which movement zeroes the signal applied by the reference member 1. Thus, there is illustrated in Fig. 1 the complete positional control system to which the fluid control valve of my invention is admirably adapted.

Referring now to Fig. 2 of the drawings, I have shown a detailed sectional view of the control valve 20 of the "4-way" type which illustrates the internal arrangement of the various elements for providing control not only of the pressure required to operate the motor 2, but also the exhaust of fluid therefrom in such a way that a single valve element may be employed for full control of the reversible motor.

The control valve apparatus 20 comprises a housing or body portion 25 provided with a casing member 26 fixedly positioned therewithin by end plates 27 and 28. Casing 26 is preferably cylindrical in shape and has a longitudinal central bore 29 adapted to slidably receive a valve element 30. The end plates 27 and 28 together form a closure for the two ends of the housing 25. The casing 26 is provided with a plurality of ported annular passages, the ports thereof being adapted to communicate with the central bore 29. Housing 25 is provided with a pair of outlet ports or motor connection ports 31 and 32 and are adapted to receive motor conduits 21, 22 respectively. Housing 25 also has a high pressure fluid inlet port 33, adapted to be connected with the conduit connected to the outlet side of the pump 18, and a pair of exhaust ports 34 and 35 adapted to be connected by conduits to the sump 17 as more clearly shown in Fig. 1. The high pressure fluid inlet port 33 communicates with ported passage 36 in casing 26, the outlet or motor connection ports 31 and 32 communicate with ported passages 37, 38 respectively of casing 26, and the exhaust ports 34 and 35 are connected respectively to passages 39 and 40 of the casing 26. It will be seen then that control of fluid in all the conduits of the system is provided by movement of the valve element 30, as hereinafter described.

Valve element 30, which is slidably fitted within the central bore 29 of casing 26, is provided with land portions which are adapted to control the flow of fluid through the control valve 20 to the motor 2 and to sump 17. Land portions 41 and 42 are adapted to normally close the ported passages 37 and 38 to fluid pressure in passage 36 from pump 18. Valve element 30 is also provided with a pair of end land portions 43 and 44 which are adapted to form a closure of the outer ends of the bore 29 to the fluid pressure in the ported passages and also to provide surface areas to which fluid pressure is applied for controlling the operation of the control valve, to be hereinafter more fully described.

In accordance with an important feature of my invention, I have provided at one end of the control valve 20 a pilot valve or booster valve generally indicated at 50. This pilot valve 50 comprises a sleeve 51 which, as illustrated, forms an integral part of the valve element 30 and comprises an axially extending end portion thereof of lesser diameter than valve element 30 and has an internal axially-extending bore 52 drilled therein. Of course, it is to be understood that the pilot valve 50 need not necessarily form an integral part of the main fluid control valve 20 but may be separate therefrom, so long as there is a connection therebetween for providing simultaneous movement of the valve element 30 and pilot valve 50. However, for convenience and ease of manufacture and for more perfect operation, I have found the integral structure shown to be desirable. The axially extending portion of valve element 30 which comprises the sleeve 51 is, as above stated, of a lesser diameter than land portions of the valve element 30. It is this portion of reduced diameter that provides the necessary correlation of surface areas between end land portions 43 and 44 for providing the proper and desired operation of the control valve as will be explained in the description of the operation thereof. Sleeve 51 is adapted to slidably fit within a bore 45 in a hub 28' of end plate 28 and is coaxial with the center bore 29 of the valve casing 26. The hub 28' is provided with ports 53 adapted to connect the bore of sleeve 51 with a passage 54 within the housing 25. This passage connects the port 53 with an end chamber 55 formed by end plate 27, the end of casing 26 and the first end of bore 29 and end face of land portion 44 of the valve element 30, the function of said chamber being hereinafter more fully described. The sleeve 51 of pilot valve 50 is provided with a central ported passage 56 the ports thereof connecting the internal bore 52 of sleeve 51 with the ports 53 and passage 54. Sleeve 51 is further provided with ports 57 which connect the internal bore 51 with the second end of bore 29 and end face of land 43 and ported passage 58 which is continually connected, through passage 59, to a source of fluid under pressure. Sleeve 51 is provided also with ports 60 which are connected to exhaust.

The pilot valve 50 further includes a valve member 61 which is adapted to slidably fit within bore 52 and has a central land portion 62 normally closing the port of ported passage 56, and end land portions 63 and 64. These end lands are provided for hydraulically balancing the valve member within the bore 52 and also serve to align the valve member 61 in the bore 52. Valve member 61 is connected to or may form an integral part of the valve actuating rod 16 hereinbefore described. Valve member 61 is further provided with a small longitudinally extending bore which will pass any fluid in the end of bore 52 to exhaust to prevent fluid pressure from building up between end of land 63 and end of bore 52.

In accordance with a further feature of my invention, the fluid pressure in passage 58 may be selected for the optimum operating pressure of the pilot valve 50. For example, it has been found that the pilot valve of the present embodiment of my invention has optimum operating characteristics when the fluid pressure controlled thereby is within a range of between 100 and 250 lbs. per square inch. Therefore, if the operating pressure of the servomotor controlled by the control valve 20 is within this range, a direct connection may be made between the ported passage 36 which is subjected to fluid under pressure from the system source of fluid pressure, or pump 18, to the passage 59 and ported passage 58. However, if, for example, the servomotor controlled by the control valve 20 is operated at any higher pressure, say 500 to 1000 lbs. per square inch depending upon the installation requirements of the system, a pressure regulator 65 may be inserted between passage 36 and passage 58 to reduce the pressure in passage 58 to the desired operating pressure of 100 to 250 lbs. as illustrated. However, it is to be further understood that the pilot valve may be operated under fluid pressure from a source of fluid pressure which is entirely independent from the system source, or pump 18.

The operation of the fluid control valve of my invention will now be described. Assuming a condition when control signal from the servo amplifier 8 is zero, armature 14 of servo actuator 10 will be in a central or neutral position relative to the legs 11, 12 and 13 thereof and therefore rod 16 which is connected thereto and to valve member 61 will be in the position shown in Fig. 2; that is, in the position wherein the land 62 of valve member 61 completely closes the passage 53, and therefore the end chamber 55, from the source of fluid pressure, and fluid in the system will be at rest. However, let us suppose that a signal from the servo amplifier 8 is such as to cause movement of the armature 14 of servo actuator 10 to the right. Such movement will produce a similar rightward movement of actuator rod 16 and valve member 61. Such movement will cause the central land portion 62 of valve 61 to move to the right, thereby opening the ported passage 56 to the fluid pressure in passage 59 and ported passage 58, and therefore also to the fluid pressure continually acting on the end surface of the land portion 43. Fluid, then, will pass through passage 54 and into the end chamber 55 causing movement of the valve member 30 to the right. This movement will occur because of the reduced end-face area of sleeve 51 adjacent port 57 as compared to the oppositely-disposed end-face area of land 43, such that land 43 actually has an effective or unbalanced end-face area equivalent to the difference between said two areas and, of course, less than the end-face area of land 44. Hence, since the end-face area of land 44 is greater than the effective end-face area of land 43, and since both areas are subjected to the same fluid pressure when member 61 is moved to the right, valve element 30 is subjected to a greater force at land 44 than at land 43, whereby element 30 is moved to the right. In practice, it has been found preferable to have about a two to one ratio exist between the aforesaid end-face areas of land 43 and sleeve 51. The valve element 30 will therefore, as above stated, closely follow the movement of pilot valve member 61 and such movement will cause land 41 to open ported passage 37 to the fluid pressure in passage 36 and therefore fluid will flow therebetween to thereby drive the motor 2 in a direction to move the rudder 3 (Fig. 1), downwardly. At the same time, of course, land portion 42 moves to the right thereby opening passage 38 to sump 17 through passage 40, thus providing the exhaust of fluid from the motor 2 in a known manner.

Starting again from a neutral position of armature 14 and therefore of valve member 61, let us assume control signal from servo amplifier 8 causes movement of the armature 14 in the opposite direction or to the left. Such movement will cause the central land portion 62 to move to the left and thereby open passage 56 and therefore passage 54 and end chamber 55 to exhaust through ports 60. The pressure in passage 56 then will cause valve element 30 to move to the left due to the reduction of fluid pressure on the end face of land 44 in end chamber 55. This left hand movement of valve element 30 effectively connects passage 36 and 38 and subjects the motor 2 to the fluid pressure supplied by pump 18 so that the motor drives in an opposite direction. At the same time, land portion 41 connects passages 37 and 39 to thereby provide the exhaust of fluid from motor 2 to sump 17 in a known manner.

It will be seen, therefore, that movement of pilot valve 61 in either direction will cause a corresponding movement of valve element 30 in the same direction. Of course, the sleeve 51, being directly connected to valve element 30, forms a follow-back connection therebetween to limit movement of valve 30 to movement of valve member 61. From the above, it will be noted that the relatively small area of the end face of land portion 43 is continually exposed or connected to a source of fluid pressure and that the larger area of the opposed end land portion 44 is subjected to varying fluid pressure under control of the pilot valve 50.

The motion of the valve element, then, and therefore the control of fluid to the servomotor, is controlled in both directions by varying the fluid pressure at one end only of the valve element by the pilot valve.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a fluid control valve, the combination with a main valve comprising a casing having a bore therein and a piston-type valve element slidably fitted therewithin, said casing having ported passages therein and said valve element having land portions adapted cooperatively with the ports of said passages to control the flow of fluid therethrough, a first end of said bore being closed and the second end thereof being connected to a source of fluid under pressure, of a pilot valve for controlling the movement of said main valve element comprising a sleeve having an internal bore therein and ported passages connecting said internal bore with the first and second ends of the bore of said main valve, and a valve member fitted within said internal bore and having valving surfaces cooperating with one of the sleeve ports for controlling the flow of fluid through said sleeve passages, said sleeve being connected to move with movement of the valve element of said main valve, the areas of the end faces of said land portions of said valve element being of different sizes to cause said valve element to move in one direction under fluid pressure at said second end upon reduction of fluid pressure at said first end and in the opposite direction upon restoration of pressure at the first end, whereby motion of said valve element in both directions is controlled by varying the pressure on the end face of the land portion at said first end only of said bore by said pilot valve.

2. In a fluid control valve, the combination with a main valve comprising a casing having a bore therein and a piston-type valve element slidably fitted therewithin, said casing having ported passages therein and said valve element having land portions adapted cooperatively with the ports of said passages to control the flow of fluid therethrough, the first end of said bore being closed and the second end thereof being connected to a source of fluid under pressure, of a pilot valve for controlling the movement of said main valve element comprising a sleeve adapted to be moved by movement of said valve element and having an internal, axially extending bore therein, a pair of passages in said sleeve having ports communicating with said internal bore and adapted to be connected to the first and second ends of the bore of said main valve, and a valve member fitted within said internal bore having a land portion cooperable with the port and passage connecting said internal bore with said first end of the bore of said main valve for passing fluid upon movement thereof from said first end to exhaust or from said second end to said first end, the area of the end surface of the land portion at said first end being different in size from the area of the end surface of the land portion of said second end so as to cause said valve element to move in one direction under fluid pressure at said second end when said first end is connected to exhaust and in the other direction when said first end is connected to the fluid pressure in said second end, whereby motion of the valve element in both directions is controlled by varying the fluid pressure on the end face of the land portion at said first end only of said bore by said pilot valve.

3. In a fluid control valve, the combination with a main valve comprising a casing having a bore therein and a piston-type valve element slidably fitted therewithin, said casing having ported passages therein and said valve element having land portions adapted cooperatively with the ports of said passages to control the flow of fluid therethrough, the first end of the bore of said main valve being closed and the second end thereof being continually connected to a source of fluid under pressure, the valve element of said main valve further including an extending end portion having an internal, axially-extending bore therein, said end portion having a pair of ported passages adapted respectively to connect said first and second ends of the bore of said main valve with said internal bore, of a valve member fitted within the internal bore of said extending end portion and having valving surfaces cooperable with one of the sleeve ports for controlling the flow of fluid from said source to said first end and the flow of fluid therefrom to exhaust, the areas of the end faces of the land portions of the valve element of said main valve being of different sizes to cause said valve element to move in one direction under fluid pressure at said second end under reduction of fluid pressure at said first end and in the opposite direction upon restoration of pressure at the first end, whereby motion of said valve element in both directions is controlled by varying the pressure on the end face of the land portion at said first end of said bore only by said pilot valve.

4. In a valve for controlling the flow of fluid to a device movable thereby, a main valve comprising a casing having a bore therein, a piston-like valve element slidably fitted therewithin, said casing having an inlet passage adapted to be connected to a source of fluid under pressure, a pair of outlet passages, and ports connecting said passages with said bore, said valve element having land portions cooperable with said outlet ports for controlling on movement thereof the flow of fluid from said inlet passage to one or the other of said outlet passages, said valve element further including end land portions adapted to form a closure of the outer ends of said bore, from fluid pressure at said inlet passage, the first outer end of said bore being closed and the second outer end thereof being continually connected to a source of fluid under pressure, a pilot valve for controlling the movement of said valve element comprising a sleeve connected to be moved by movement of said valve element and having an internal, axially-extending bore therein, first, second and third ported passages in said sleeve respectively connected to said second end, the first outer end of said bore and exhaust, a valve member fitted within said internal bore and having a land portion cooperable with said second port for passing fluid upon movement thereof from said first end to said third port or said second end to said first end, the area of said first end being different in size from the area of said second end so as to cause said valve element to move in one direction when said first end is connected to said third port and in the other direction when said first end is connected to said first port, whereby motion of the valve element in both directions is controlled by varying the fluid pressure at said first end only by said pilot valve.

5. In a valve for controlling the flow of fluid to a device movable thereby, a main valve comprising a casing having a bore therein, a piston-like valve element slidably fitted therewithin, said casing having an inlet passage adapted to be connected to a source of fluid under pressure, a pair of outlet passages, and ports connecting said passages with said bore, said valve element having land portions cooperable with said outlet ports for controlling on movement thereof the flow of fluid from said inlet passage to one or the other of said outlet passages, said valve element further including end land portions adapted to form a closure of the outer ends of said bore to the fluid pressure at said inlet passage, the first outer end of said bore being closed and the second outer end thereof being continually connected to a source of fluid under pressure, the end of said valve element at said second bore end having an axially extended portion, an internal, axially-extending bore in said portion, first, second and third ported passages in said extended portion connecting said internal bore respectively with a source of fluid pressure, the first end of the bore of said main valve, and exhaust, a valve member slidably fitted within said internal bore having a land portion for controlling on axial movement thereof in opposite directions the flow of fluid from said first port to said second port or from said second port to said third port, the areas of the end land portions of said valve element being of different sizes to cause movement thereof in one direction under fluid pressure at said second end when said first end is connected to said third port and in the other direction when said first end is connected to said first port, whereby motion of the valve element in both directions is controlled by varying the fluid pressure at said first end only by said pilot valve.

6. In a fluid control valve, the combination with a main valve comprising a casing having a bore therein and a piston-type valve element slidably fitted therewithin, said casing having ported passages therein and said valve element having valving surfaces adapted cooperatively with the ports of said passages to control the flow of fluid therethrough, the first end of said bore being closed and the second end thereof being connected to a source of fluid under pressure, of a pilot valve for controlling the movement of said main valve element comprising a sleeve connected to be moved by movement of said valve element and having an internal, axially extending bore therein, a first ported passage within said casing connecting said internal bore with the first end of the main valve, a second ported passage connecting said internal bore with the second end of the bore of the main valve, a valve member fitted within said internal bore having a land portion cooperable with the port and passage connecting said internal bore with said first end of the bore of said main valve for passing fluid upon movement thereof from said first end to exhaust or from said second end to said first end, the area of said first end being different in size from the area of said second end so as to cause said valve element to move in one direction under fluid pressure at said second end when said first end is connected to exhaust and in the other direction when said first end is connected to the fluid pressure in said second end, whereby motion of the valve element in both directions is controlled by varying the fluid pressure at said first end only by said pilot valve.

7. In a fluid control valve, the combination with a main valve comprising a casing having a bore therein and a piston-type main valve element slidably disposed therewithin, said casing having passages communicating through ports with said bore and said valve element having land portions including two end-land portions disposed to cooperate with the ports of said passages to control the flow of fluid therethrough, the first end of said bore adjacent a first end-land being closed and the second end thereof adjacent the second end-land being at all times connected to a source of fluid under pressure to thereby continually submit the outer face of said second end-land of said valve element to fluid pressure, of a pilot valve comprising a sleeve connected to and of lesser diameter than said second end-land and said sleeve being slidably fitted within said casing whereby the fluid pressure supplied to the outer face of the second end-land of the main valve tends to urge said valve element toward the first end of said bore, said sleeve having an internal, axially extending bore therein and a plurality of passages communicating through ports with the internal bore of said sleeve, one of said sleeve passages being connected with a source of fluid under pressure, a second of said sleeve passages communicating with the first end of said main valve bore, and a third of said sleeve passages connecting with exhaust, and a pilot valve member fitted within said internal bore of the sleeve and having a land portion cooperating with at least one of the ports in said sleeve for controlling the flow of fluid to and from the first end of said main valve bore, the effective area of the outer face of the first end-land being greater than that of the outer face of the second end-land so that said main valve element may be moved in one or the other direction depending upon the magnitude of the fluid pressure existing at the first end of the main valve bore and thereby positioned in accordance with operations of said pilot valve.

References Cited in the file of this patent

UNITED STATES PATENTS

| Number | Name | Date |
|---|---|---|
| 306,097 | Otis | Oct. 7, 1884 |
| 509,847 | Hall | Nov. 28, 1893 |
| 597,388 | Brown | Jan. 18, 1898 |
| 734,285 | Thomann | July 21, 1903 |
| 929,206 | Gelpke | July 27, 1909 |
| 2,357,986 | Wichterman | Sept. 12, 1944 |
| 2,446,149 | Wells | July 27, 1948 |
| 2,502,009 | Huyser | Mar. 28, 1950 |

FOREIGN PATENTS

| Number | Country | Date |
|---|---|---|
| 354,048 | Germany | June 1, 1922 |